United States Patent [19]
Marckx et al.

[11] 3,730,032
[45] May 1, 1973

[54] BREAD AND PASTRY PROCESSING APPARATUS

[75] Inventors: Edward I. Marckx, Portland; Harvey F. Stines, Gresham, both of Oreg.

[73] Assignee: Stinemark Corporation, Gresham, Oreg.

[22] Filed: July 29, 1970

[21] Appl. No.: 64,847

Related U.S. Application Data

[60] Division of Ser. No. 824,723, April 17, 1969, Pat. No. 3,614,933, and a continuation of Ser. No. 639,343, May 18, 1967, abandoned.

[52] U.S. Cl. ..................83/11, 83/12, 83/168, 83/397, 83/478, 83/564
[51] Int. Cl. ..................................B26d 3/08
[58] Field of Search..............83/11, 12, 168, 169, 83/488, 564, 397, 478, 469; 107/8 L; 146/73

[56] References Cited

UNITED STATES PATENTS

| | | | |
|---|---|---|---|
| 1,958,912 | 5/1934 | Clark | 83/169 X |
| 1,402,923 | 1/1922 | Dempsey | 83/169 |

FOREIGN PATENTS OR APPLICATIONS

| | | | |
|---|---|---|---|
| 232,510 | 3/1911 | Germany | 107/8 L |
| 537,752 | 11/1931 | Germany | 107/8 L |

*Primary Examiner*—J. M. Meister
*Attorney*—Eugene D. Farley

[57] ABSTRACT

Apparatus for splitting, water-spraying and seeding the upper surfaces of bakery products preliminary to baking them is mounted directly in front of the oven. It includes a track, a carriage, and a carriage drive for moving the carriage across the bakery products. Mounted on the carriage are cutters, a spray, and a seeder arranged, respectively, for splitting, spraying, and seeding the upper surfaces of the bakery products. These units work during a continuous passage of the carriage across the oven door. The processed products then may be introduced immediately into the oven for baking.

1 Claim, 6 Drawing Figures

Patented May 1, 1973  3,730,032

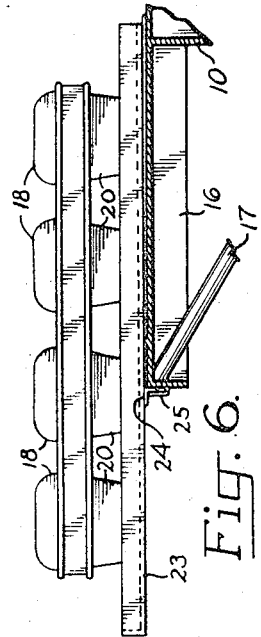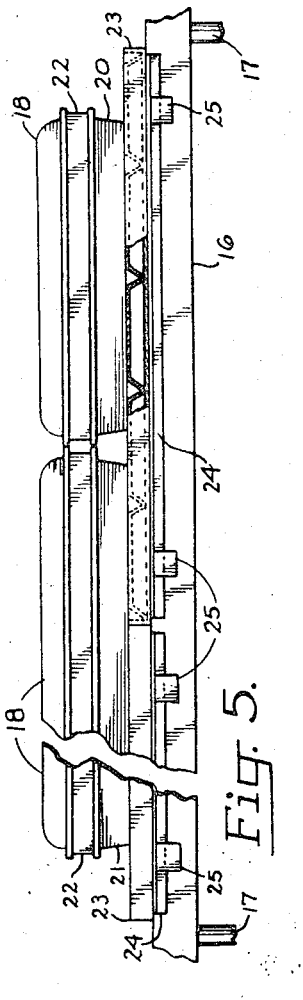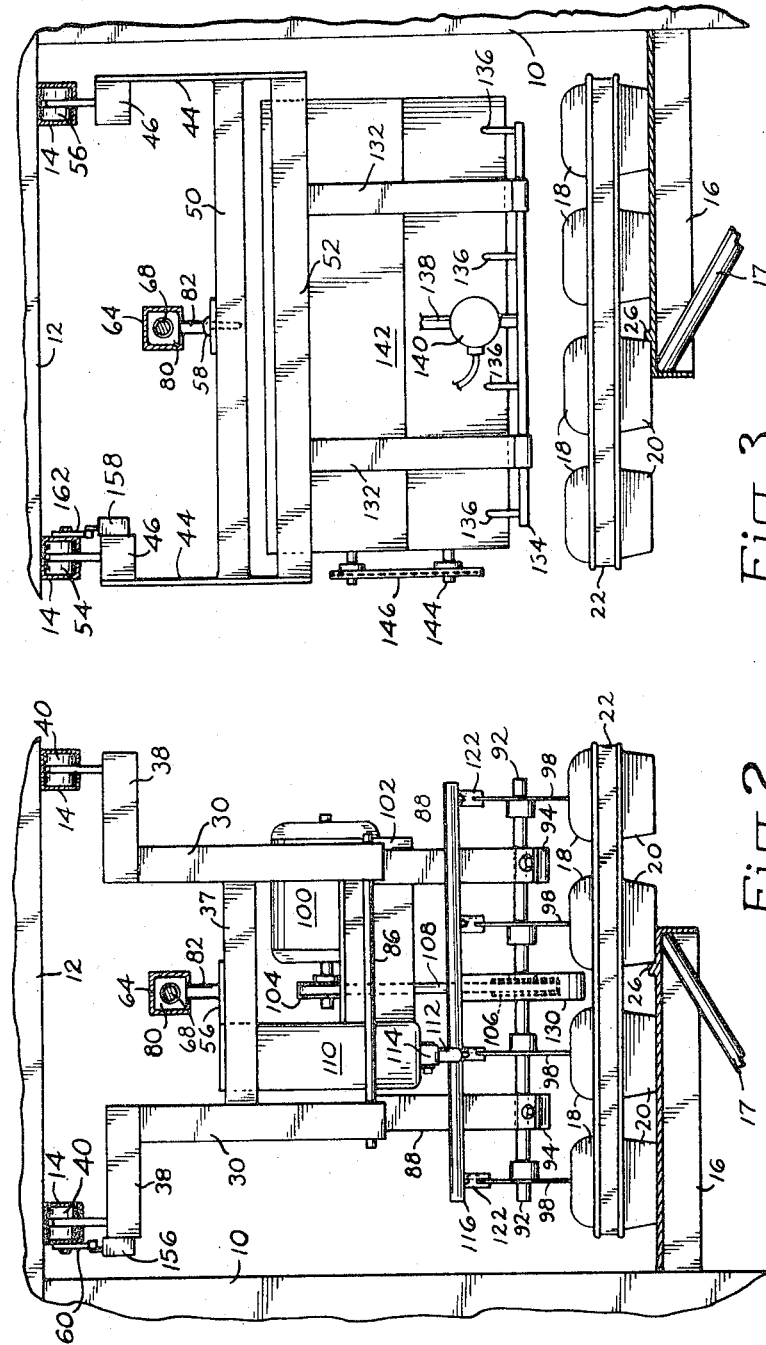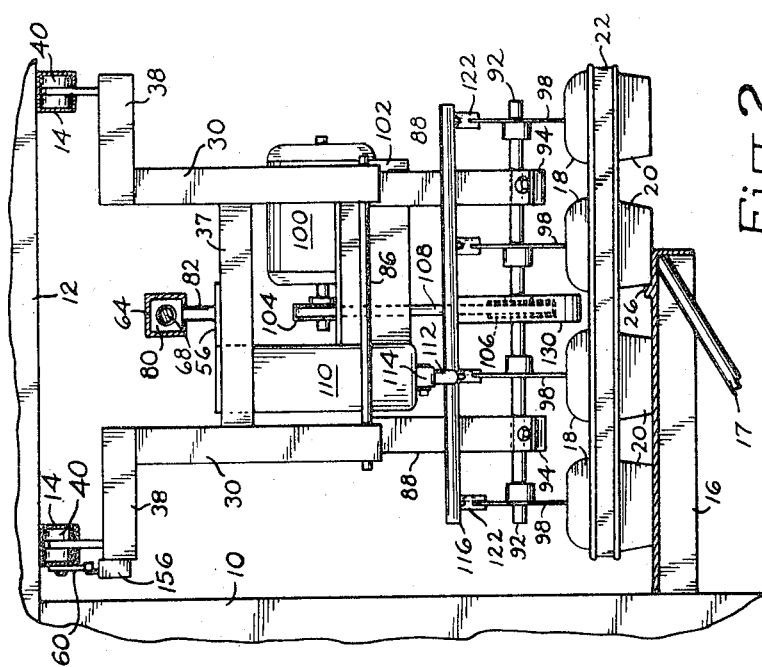

BREAD AND PASTRY PROCESSING APPARATUS

This is a division of the patent application of Edward I. Marckx and Harvey F. Stines, Ser. No. 824,723, filed Apr. 17, 1969 for BREAD AND PASTRY PROCESSING APPARATUS, now U.S. Pat. No. 3,614,933 the same being a continuation of the patent application Ser. No. 639,343, filed May 18, 1967, now abandoned, of the same title by the same inventors.

This invention relates to apparatus for splitting, spraying, seeding and in other ways processing the upper surfaces of bakery products preliminary to introducing them into an oven.

It is common bakery practice to spray and seed the upper surfaces of raised bakery products preliminary to putting them into the oven. It also is common practice to split the upper surfaces of the products. This is particularly desirable in the case of balloon bread, since it squares off the top of the loaves, making them more attractive in appearance and also making them look larger.

Over the centuries various techniques have been developed for accomplishing these functions. Most of them, however, are carried out by hand, or by means of simple ineffective apparatus which unnecessarily increases the cost of processing.

It is the principal purpose of the present invention to provide apparatus which is associated with the baker's oven and which, in a single continuous operation splits, sprays and seeds the upper surfaces of bakery products, particularly loaves of bread, preliminary to introducing them into the oven.

Another object of the invention is the provision of such apparatus, the application of which gives the loaves a hand-kneaded appearance and materially increases oven spring, i.e., rising of the dough in the oven, thereby still further increasing the apparent size of the loaves.

A further object of the invention is to provide such apparatus which operates efficiently without damaging the products, without requiring extensive modification of the oven, and without increasing labor costs.

The foregoing and other objects of the invention are accomplished by the provision of apparatus which, in contradistinction to the apparatus of the prior art is mounted directly on the oven, in front of the oven door. The apparatus basically comprises a track positioned above the oven door, a carriage supported on the track, and a carriage drive connected to the carriage for driving it along the track at a controlled and predetermined rate.

An apron or other support is provided beneath the track and carriage. It is designed to support the bakery products, for example a plurality of loaves of bread contained in pans.

Mounted on the carriage are cutters which split the upper surfaces of the bakery products, a spray which sprays their upper surfaces, and a seeder which sprinkles seeds and other edible particles on the moistened surfaces. Semi-automatic control means are provided so that, merely by pressing a button, the baker can initiate the complete sequence or selected elements thereof.

In the drawings:

FIGS. 2 and 3 are front and rear elevations, respectively, of the apparatus of FIG. 1;

FIGS. 5 and 6 are views in side and end elevation, respectively, illustrating a novel tray support for use on the apparatus of the invention.

Figure 1:
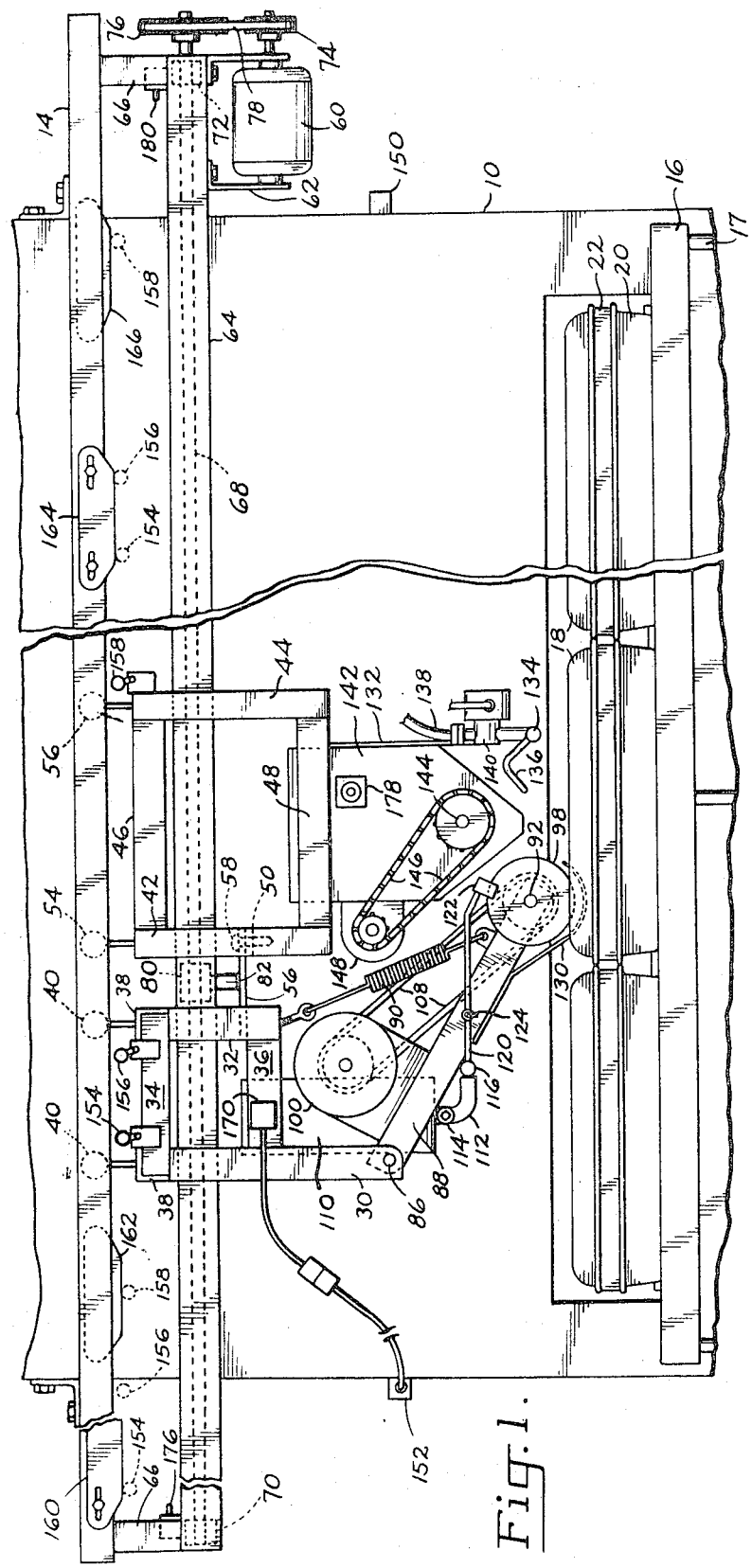
FIG. 1 is a view in side elevation of the herein-described apparatus illustrated in its working position in front of a baker's oven.

As is shown in the drawings, the apparatus of the invention is mounted on a bakery oven 10 directly in front of the oven door. To accommodate the apparatus, the oven need be modified but slightly. It only is necessary to provide an overhead support 12 for a pair of parallel tracks 14, and a lower support 16 for the bakery products to be processed. These may comprise, for example, a plurality of loaves of bread 18 which have been raised in pans 20 and placed in spaced apart relation to each other in racks or frames 22. As has been indicated above, however, other types of bakery products may be processed by the apparatus if desired.

Support 16 preferably comprises an apron which is hinged to the front of the oven so that it may be dropped downwardly out of the way when the apparatus is not in use. When in use, it is supported by braces 17.

Preferably the support is relatively narrow so that the baker may stand close to the oven and reach inside it as required to perform his various duties. As a result, the bakery products held in rack 22 overhang the apron in the manner shown in FIGS. 2 and 3.

If desired, pans 20 containing the bakery products may be placed in a catch pan 23 (FIGS. 5 and 6) which extends beneath all of the baking pans. The catch pan is provided with an angle iron catch 24 which engages brackets 25 on apron 16 thus removably securing the catch pan on the apron. The catch pan thus intercepts and stores any surplus material which may not adhere to the surfaces of the bakery products during its application.

Also, to insure locating the bakery products in exactly the proper position, there may be provided a longitudinal rib 26 extending the length of apron 16 a spaced distance inwardly from its outer edge. Pans 20 then may be abutted against the rib each time they are used, thereby locating them in exactly the proper position for operation of the processing units.

Tracks 14 mount a carriage which supports the various operating units of the assembly and which, in the illustrated embodiment, is divisible into two sub-carriages each of which may be used independently of the other, thereby increasing the versatility of the apparatus.

Thus the cutter carriage includes horizontally spaced vertical framing members 30, 32 and vertically spaced horizontal frame members 34, 36 as well as transverse horizontal framing members 37.

Vertical framing members 30, 32 are provided with outwardly projecting, horizontal extensions 38 which mount rollers 40. These in turn track on tracks 14.

The carriage which supports the spraying and seeding units has a similar box-type construction. It comprises vertical, horizontally spaced hangers 42, 44; upper and lower vertically spaced horizontal frame members 46, 48; and transverse horizontal frame members 50, 52. It is supported by means of two pairs of rollers 54, 56 which are received in tracks 14.

The two carriage components thus constructed are coupled together releasably by means of a tongue 56 one end of which is fixed to the cutter carriage frame and the other end of which overlaps transverse frame member 50 of the water spray and seeder carriage frame. Registering openings are provided in the overlapped members. These receive a coupling pin 58 which may be inserted when it is desired to operate the two components as a single unit.

The drive for the carriage is illustrated particularly in FIG. 1.

It comprises a reversible motor 60 mounted on brackets 62. These in turn are bolted to an elongated housing 64 supported from tracks 14 by means of vertical bars 66.

Housing 64 contains a long drive screw 68 the ends of which are journaled in bearings 70, 72. Motor 60 is coupled to screw 68 through a pulley 74 keyed to the shaft of the motor, a second pulley 76 keyed to the end of the screw, and a connecting belt 78.

A traveling nut 80 is threaded on drive screw 68. It is connected through a neck 82 with coupling plate 56.

Accordingly, the carriage unit may be reciprocated past the oven door at a rate determined by the speed of motor 60 and in a direction determined by the direction of its rotation.

The construction of the cutter assembly mounted on the cutter carriage is shown particularly in FIGS. 1 and 2.

Hinged by means of a pivot rod 86 to the lower end of vertical posts 30 are a pair of lever arms 88. The outer ends of the lever arms hang freely, being resiliently supported by a coil spring 90 interconnecting them with the upper portions of the frame.

A shaft 92 is journaled in bearings 94 mounted on the outer ends of lever arms 88. Fixed to shaft 92 are a plurality of laterally spaced cutters 98. The spacing between the cutters is predetermined to center them exactly on the loaves of bread or other baker's products immediately below. They are suitably constructed of steel or other metal on which a cutting edge may be maintained.

Cutters 98 are driven by means of a reversible motor 100 mounted on a platform 102 supported between lever arms 88. A pulley 104 mounted on the shaft of the motor is coupled to pulley 106 keyed to shaft 92 by means of a connecting belt 108.

Means are provided for lubricating the cutters to prevent the freshly cut dough from sticking to them.

To this end there is provided a reservoir 110 the lower end of which is provided with a discharge conduit 112 having a shut off valve 114. Conduit 112 communicates with a cross conduit 116 which extends the width of the cutter assembly, overlying all of the cutter heads.

Tubes 120 communicate at one end with conduit 116 and at the other end with split felt pads 122. The pads receive the cutting margins of cutters 98. Each tube is provided with a petcock 124.

A supply of a suitable lubricant, such as an edible vegetable oil, is contained in reservoir 110. The oil flows through tubes 120 at a rate determined by the setting of petcocks 124. Upon being fed to felt pads 122, it lubricates the margins of the cutters in the desired manner.

Means also are provided for guarding the cutters and insuring that they do not inadvertently contact the frames which hold the pans, or other solid objects which might damage their sharp edges.

The means provided for this purpose comprise a shoe 130 having an arcuate lower end which serves as a guiding surface. The shoe is mounted centrally of a selected transverse structural component, for example cross conduit 116. It extends downwardly below the plane of the cutters a sufficient distance to guide the cutters over any obstruction which may be present in their paths.

The construction of the water-spray and seeding units employed in conjunction with, or separately from, the cutters is illustrated in FIGS. 1 and 3.

Depending from transverse horizontal member 52 are a pair of spaced, vertical straps 132. The lower ends of the straps are formed with sleeves which receive a horizontal pipe 134. This pipe has a length sufficient to span the clustered bakery products to be sprinkled. It is provided at spaced intervals with spray nozzles 136.

The heads of nozzles 136 are directed upon the surfaces to be sprayed. It is to be noted, however, that the shanks of the nozzles are formed with an upwardly directed reverse bend. This serves an important function, as it prevents the dripping of water from the nozzles when the spray is shut off, and thus avoids damaging any products which might be located below the sprays.

Water is supplied to spray 136 through a water line 138. The flow of water to the line is controlled by means of a solenoid-operated valve 140.

It is a feature of the invention that liquid applications other than water may be applied through sprays 136 if desired. Such applications might include, for example, flavorings, toppings and glazes.

The seeding unit comprises a suitable bin 142 supported on the framework of the unit. The bin has a discharge opening at its bottom and is provided with a corrugated feed roll 144 of conventional construction, not illustrated.

The feed roll is coupled through a chain 146 to a rheostat-controlled gear head motor 148 mounted on the hopper or elsewhere on the frame. A positive drive thus is afforded which meters the contents of the bin at a rate determined by the rotational speed of motor 148.

Figure 4:
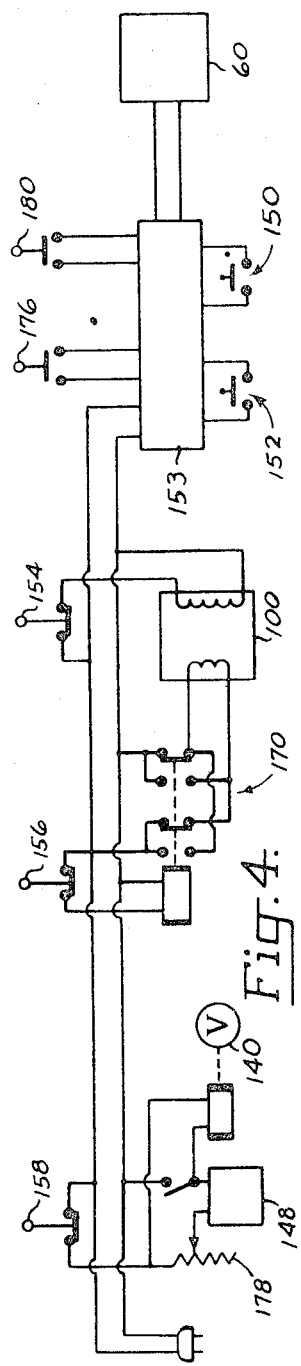
FIG. 4 is a schematic electrical circuit illustrating the manner of controlling the operation of the apparatus of FIGS. 1, 2 and 3.

Semi-automatic control of the unit as it traverses the bread or other bakery products, one pass at a time, is provided by the elements illustrated particularly in FIGS. 1 and 4.

Reversible motor 60, which drives screw 68, and hence the entire carriage, is controlled by means of two switches 150, 152. These control separate forward and reverse windings of the motor through control unit 153.

After the baker has arranged the pans on apron 16, he pushes switch 150. This energizes motor 60 in the forward direction, driving the carriage along the full length of the track until it reaches the far end, where it is stopped automatically by opening of limit switch 176. After removing the processed items and placing a fresh set of pans on the apron, the baker pushes switch 152. This energizes motor 60 in the reverse direction, causing it to travel back to its original position, where it is stopped automatically by opening of limit switch 180.

During each traverse of the carriage, the cutter, water spray, and seeding units are started and stopped automatically by means of microswitches 154, 156, 158 located in spaced relation to each other on the carriage, and cooperating cams 160, 162, 164, 166 located in appropriately spaced relation on the track.

The operation of the cutter unit is controlled by means of microswitches 154, 156, cams 160, 164, and a double pole, double throw, magnetic relay reversing switch 170, all in the circuit relationship to each other illustrated in FIG. 4.

At the start of the operation, with the carriage on the right hand side of the oven, as viewed in FIG. 1, normally closed microswitches 154, 156, rest in their dotted line position on the projecting surface of cam 164. In this position the microswitches are open and the circuits of the cutter unit deenergized.

When the baker starts screw 68 by pushing switch 150, the carriage moves to the left. Microswitches 154, 156 move off cam 164 and assume their closed position in which the circuits are energized. Closing microswitch 154 energizes the circuit including motor 100 which is driven in its forward direction, rotating cutters 98 clockwise as viewed in FIG. 1, so that they move upwardly as they enter the dough, thus insuring efficient cutting.

Closing microswitch 156 energizes a circuit including reversing switch 170 which is cocked so that when the motor circuit later is deenergized, the switch operates to reverse the circuit to the motor.

When the carriage reaches the end of its travel on the left hand side of the oven, it contacts a limit switch 176 which arrests its motion. In this position microswitches 154, 156 assume their dotted line positions on the left hand side of FIG. 1, with microswitch 154 engaging cam 160 and hence moved to its open position, and microswitch 156 out of contact with the cam and hence still in its normally closed position. At this point switch 170 reverses the direction of the current through the windings of cutter motor 100.

At the same time as the operation of the cutters is controlled in the manner just described, the operation of the water spray and seeder units is regulated in a coordinate manner. Both of these units are controlled by microswitch 158.

In the right hand position of the carriage, microswitch 158 is in its dotted line, right hand position, in contact with cam 166 which adjusts it to its open position. Accordingly, the water spray and seeder units are deenergized.

However, when the baker drives the carriage to the left, microswitch 158 moves off cam 166 and assumes its normally closed position. This does two things.

First it energizes valve 140 and initiates the spray. Second it energizes a rheostat 178 which is in the circuit with variable speed gear head motor 148. This drives the motor at a speed commensurate with the setting of the rheostat and in turn drives corrugated roll 144 to deliver seeds or other edible granular material from the opening of hopper 142 in metered amount.

As has been noted, the position of spray heads 136 relative to the discharge opening of hopper 142 is such that the solid particles from the hopper are deposited on the moist surface of the loaves of bread or other bakery articles, to which surfaces they stick because of the moistened surface condition.

After its traverse from right to left has been completed, the movement of the carriage is stopped by operation of limit switch 176. Microswitch 158 thereupon assumes its dotted line position on the left hand side of FIG. 1, in contact with cam 162, and in a deenergized condition.

When the baker starts the reverse cycle by closing switch 152, the operating units perform in the same manner, with the exception that cutters 98 rotate in the reverse direction, i.e., counterclockwise as viewed in FIG. 1, thereby cutting upwardly as they penetrate the dough. When the carriage has reached its extreme right hand position, it contacts limit switch 180, which automatically shuts down the drive, with microswitches 154, 156, 158 in their right hand open positions.

Thus there is provided an apparatus which is a useful adjunct of the bakery oven. By its use, loaves of bread and other bakery products may be slit rapidly, while contemporaneously being sprayed with water and sprinkled with various edible granules. These functions are accomplished without additional labor and without extending the oven schedule. In addition, they are accomplished by a device which easily may be attached to any of the conventional ovens without substantial modification thereof and without interfering with its normal functions.

Having thus described our invention in illustrative embodiments, we claim:

1. Apparatus for splitting the upper surfaces of bakery products container in pans preliminary to introducing them into an oven, the apparatus comprising
    a. support means for supporting bakery product pans adjacent the oven and including longitudinally and laterally spaced frame members supporting the pans in longitudinally and laterally spaced relation,
    b. second support means positioned above the first support means,
    c. cutter means mounted on the second support means and arranged for splitting the upper surfaces of bakery products in the pans, and
    d. drive means connected to one of the first support means and second support means for traversing one relative to the other for splitting the bakery product surfaces,
    e. the cutter means comprising
        1. elongated arm means connected pivotally at one end to the second support means,
        2. a plurality of laterally spaced rotary cutters mounted at the opposite end of the arm means in alignment with bakery products to be split,
        3. resilient means interengaging the arm means and second support means for supporting the cutters in operative position, and
        4. guide means supported for movement with the arm means and extending between adjacent spaced pans and below the plane of the cutters for guiding the latter over the transverse frame members of the first support.

* * * * *